Patented May 28, 1940

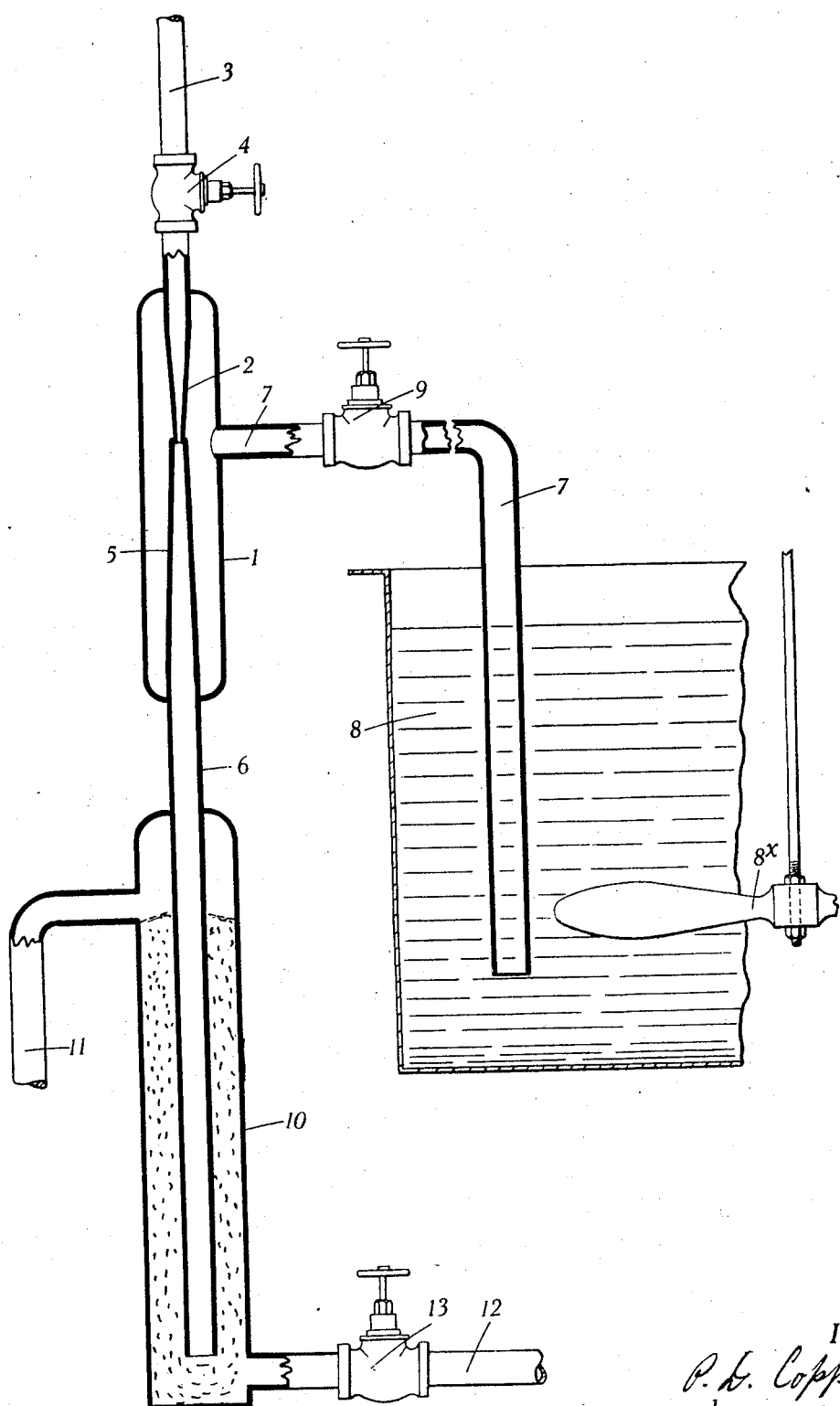

2,202,573

UNITED STATES PATENT OFFICE 2,202,573

MANUFACTURE OF STARCH PASTE

Philip Dalton Coppock, Bebington, Wirral, England, assignor to The Distillers Company Limited, Edinburgh, Scotland, a British company Application October 3, 1938, Serial No. 233,126
In Great Britain October 13, 1937

1 Claim. (Cl. 127—28)

This invention relates to the manufacture of starch paste and has for its object the provision of a method of and means for manufacturing starch paste in a continuous manner to obviate the use of bulky manufacturing plant, to render bulk storage unnecessary, and to enable the paste to become available at a predesired rate.

According to the present invention a continuous stream of steam is intimately mixed with amylaceous material such as manioc flour or maize or potato starch in suspension in water in the form of a continuous stream, the two streams being so set or regulated that the mixture is entirely converted by the heat into starch paste of requisite consistency which is continuously used or collected as such.

The aqueous suspension of manioc flour or the like may be supplied by gravity or under pressure from a reservoir but preferably it is sucked from a reservoir by the steam by using the latter in a steam ejector device, the advantage of this being that variations in steam flow automatically cause correspondingly adequate variations in suspension flow, and that when the steam supply is cut off the induced stream of suspension automatically stops.

It will be understood that such a system is quite different from the use of steam injectors immersed in a tank or reservoir containing a bulk of raw starch in aqueous suspension for the purpose of heating and agitating the bulk of liquid. In such a system any considered portion of the starch on passing through the injector is projected back into the main bulk of liquid whereas the method of the present invention affords a continuous stream of completely gelatinised starch.

In order that the invention may be clearly understood and readily carried into effect I will now describe the same more fully with reference to the accompanying drawing which illustrates somewhat diagrammatically one form of apparatus suitable for the purpose.

The apparatus comprises a vertical substantially cylindrical chamber 1 through the top of which projects a downwardly converging steam nozzle 2 supplied with steam from a pipe 3 controlled by a valve 4. The tip of the steam nozzle 2 is close to the mouth of a downwardly divergent delivery nozzle 5 coaxial with the steam nozzle and projecting upwardly inside the chamber 1 from the base thereof and continuing thence in the form of a delivery pipe 6. Connected laterally to the chamber 1 near the meeting level of the nozzles 2 and 5 is the flour suspension feed pipe 7 which extends down into the flour suspension which is kept in agitation in the reservoir 8 by suitable means such as a paddle 8ˣ. A regulating valve 9 can be used to adjust the volume of flow of the flour suspension. The delivery pipe 6 terminates above the bottom of a steadying chamber 10 in which a small amount of the paste issuing from the pipe 6 collects and dwells temporarily before leaving by the exit pipe 11 near the upper end of this chamber. 12 is a drain pipe with valve 13 for occasional use.

In operation, steam is admitted from pipe 3 to the steam nozzle 2 and passes into the nozzle 5 drawing with it a stream of the flour suspension from the reservoir 8 by way of the valve 9 and pipe 7. The flour becomes "cooked" by the heat of the steam which condenses, and the paste collects in the steadying chamber 10 and finally escapes through the exit pipe 11. A suitable steam supply pressure is fifty pounds per square inch. The production may be irregular at first, but steady conditions can easily be established by regulating the feeds of steam and suspension fluid. The conditions to be established should also be such that the steam is condensed and that the heating effect on the flour suspension is sufficiently intense and prolonged to bring about the conversion of the flour and water mixture into adhesive paste of the desired consistency.

When the supply of steam is stopped the flour suspension in the pipe 7 recedes into the reservoir 8. Residual steam may drive out the paste in the steadying chamber 10, but if not and if the presence of residual paste in the chamber 10 is detrimental to restarting manufacture, the residual paste can be blown out through the drain pipe 12.

What I claim is:

An apparatus for manufacturing starch paste comprising a mixing chamber, an ejector within said mixing chamber having a steam supply under pressure in connection therewith, means for conveying amylaceous material suspended in water into said chamber for forming a mixture with the steam issuing from said ejector, a collecting chamber having an outlet in its upper portion and a conduit for conveying said mixture from said mixing chamber to a point within said collecting chamber adjacent the bottom thereof.

PHILIP DALTON COPPOCK.